(12) United States Patent
Rippolone

(10) Patent No.: US 7,149,600 B2
(45) Date of Patent: Dec. 12, 2006

(54) PIPE STORAGE AND INVENTORY CONTROL CHEST

(75) Inventor: Joseph D. Rippolone, Grosse Pointe Farms, MI (US)

(73) Assignee: Waterfall Inc., Detroit, MI (US)

(*) Notice: Subject to any disclaimer, the term of this patent is extended or adjusted under 35 U.S.C. 154(b) by 0 days.

(21) Appl. No.: 10/681,696

(22) Filed: Oct. 8, 2003

(65) Prior Publication Data
US 2005/0080509 A1    Apr. 14, 2005

(51) Int. Cl.
*G06F 17/00* (2006.01)

(52) U.S. Cl. .............. 700/237; 700/231; 700/236; 221/12; 221/13; 221/208; 414/22.51

(58) Field of Classification Search ............ 414/22.51, 414/22.62; 211/60.1, 70.4, 83, 163, 170, 211/162; 221/12, 13, 123, 208, 231, 222, 221/277; 700/231, 236, 241, 244, 237
See application file for complete search history.

(56) References Cited

U.S. PATENT DOCUMENTS

| | | | | |
|---|---|---|---|---|
| 84,103 | A * | 11/1868 | Foote .......................... 431/293 |
| 905,401 | A * | 12/1908 | Billmeyer ..................... 221/13 |
| 2,420,812 | A * | 5/1947 | Brunner ....................... 221/174 |
| 3,297,200 | A * | 1/1967 | Andrews et al. ............. 221/175 |
| 3,737,072 | A * | 6/1973 | Deitrick ...................... 221/203 |
| 3,890,079 | A | 6/1975 | Slater |
| 4,308,974 | A * | 1/1982 | Jones .......................... 221/196 |
| 4,429,806 | A * | 2/1984 | Schwarzli .................... 221/20 |
| 4,511,058 | A * | 4/1985 | Carminati .................... 221/2 |
| 4,567,997 | A * | 2/1986 | Portyansky ................. 221/233 |
| 4,718,573 | A | 1/1988 | Wenkman et al. |
| 4,785,969 | A * | 11/1988 | McLaughlin ................. 221/2 |
| 5,066,212 | A | 11/1991 | Moran, Jr. |
| 5,097,493 | A * | 3/1992 | Hillen et al. ................ 378/98.2 |
| 5,127,543 | A * | 7/1992 | Meisels ........................ 221/4 |
| 5,160,685 | A | 11/1992 | Moran, Jr. |
| 5,351,857 | A * | 10/1994 | Gonzalez ..................... 221/265 |
| 5,358,371 | A | 10/1994 | Neddo |
| 5,423,651 | A | 6/1995 | Dinverno |
| 5,431,301 | A * | 7/1995 | Suzuki et al. ............... 221/203 |
| 5,555,965 | A * | 9/1996 | Mishina ...................... 194/217 |
| 5,556,253 | A * | 9/1996 | Rozendaal et al. ......... 414/797.7 |
| 5,745,366 | A * | 4/1998 | Higham et al. ............. 700/242 |
| 5,883,806 | A * | 3/1999 | Meador et al. ............. 700/244 |
| 5,938,072 | A * | 8/1999 | Lamoureux et al. ........ 221/253 |
| 5,960,988 | A * | 10/1999 | Freixas ........................ 221/13 |
| 5,984,509 | A * | 11/1999 | Scott .......................... 700/237 |
| 6,004,020 | A * | 12/1999 | Bartur ........................ 700/236 |
| 6,074,153 | A * | 6/2000 | Allen ....................... 414/22.53 |
| 6,085,852 | A * | 7/2000 | Sparks et al. ................ 175/52 |
| 6,092,977 | A * | 7/2000 | Fuchigami ............... 414/746.4 |
| 6,120,234 | A | 9/2000 | Dinverno |
| 6,151,536 | A * | 11/2000 | Arnold et al. .............. 700/237 |
| 6,179,065 | B1 * | 1/2001 | Payne et al. ................. 175/24 |
| 6,408,954 | B1 * | 6/2002 | Price et al. ................... 175/52 |
| 6,419,029 | B1 * | 7/2002 | Bayer et al. ................. 172/52 |
| 6,510,962 | B1 * | 1/2003 | Lim ............................ 221/15 |

(Continued)

Primary Examiner—Khoi H. Tran
(74) Attorney, Agent, or Firm—Carlson, Gaskey, & Olds

(57) ABSTRACT

A materials storage chest system stores and selectively dispenses pipe in response to a controller which selectively limits access thereto. A material dispensing opening prevents access to the chest other than through the controller. A communication system provides for communication between the controller and a remote location to simplify inventory management and alert re-supply operators such that the system will provide adequate material supply.

18 Claims, 3 Drawing Sheets

U.S. PATENT DOCUMENTS 6,543,551 B1 * 4/2003 Sparks et al. ................. 175/52

6,785,589 B1 * 8/2004 Eggenberger et al. ...... 700/231

* cited by examiner

PIPE STORAGE AND INVENTORY CONTROL CHEST

BACKGROUND OF THE INVENTION

The present invention relates to a raw materials storage chest, and more particularly to inventory control and dispensing of valuable plumbing materials.

Unfortunately, theft at job sites may be common. Theft of relatively expensive raw materials such as lengths of pipe is quite common. Oftentimes raw materials are located on a job site and employees simply draw whatever quantities are required for the job. This availability of raw materials permits an employee to simply take more materials than required for the present job and utilize the raw materials for personal or other projects.

Plainly, the loss of raw materials increases the overall cost of a job and may increase the difficulty of tracking inventories.

Accordingly, it is desirable to provide storage of valuable raw materials which minimizes theft and simplifies inventory management.

SUMMARY OF THE INVENTION

The materials storage chest system according to the present invention stores and selectively dispenses pipe such as brass pipe in response to a controller that selectively limits access thereto.

An input device receives information from an employee such as employee number, job numbers, and a desired quantity of material. A material dispensing opening dispenses the materials from within the chest to a materials receiving basket in response to the controller. The material dispensing opening prevents access to the chest other than through the controller. The materials receiving basket provides an accessible temporary storage for the employee receiving a relatively large quantity of materials at one time.

A communication system provides for communication between the controller and a remote location to simplify inventory management and alert re-supply operators such that the system will consistently contain an adequate material supply.

The present invention therefore provides storage of valuable raw materials which minimizes theft and which simplifies inventory management.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
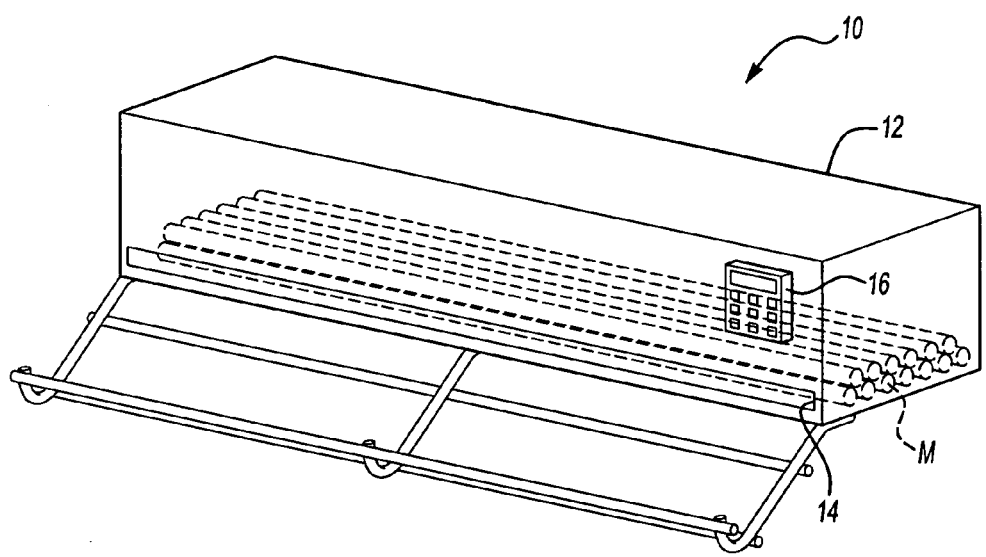
FIG. 1 is a general perspective view of a pipe storage chest according to the present invention.

FIG. 1 illustrates a general perspective view of a materials storage chest system 10. The system 10 preferably stores and selectively dispenses pipe such a brass pipe of predetermined lengths, however, it should be understood that other relatively expensive raw materials will also benefit from the present invention.

The system 10 includes a storage chest 12, a material dispensing opening 14 and a controller 16 which selectively actuates the material dispensing opening 14 to dispense a quantity of material contained within the chest 12. The chest 12 is of a size and shape to contain a significant quantity of material M and is weather proof so as to protect the materials contained therein.

Figure 2:
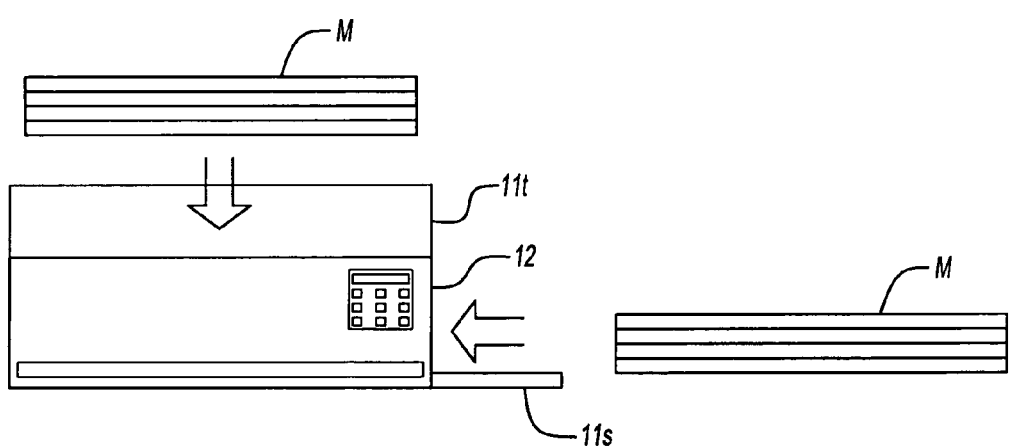
FIG. 2 is a front view of another pipe storage chest according to the present invention.
Figure 3:
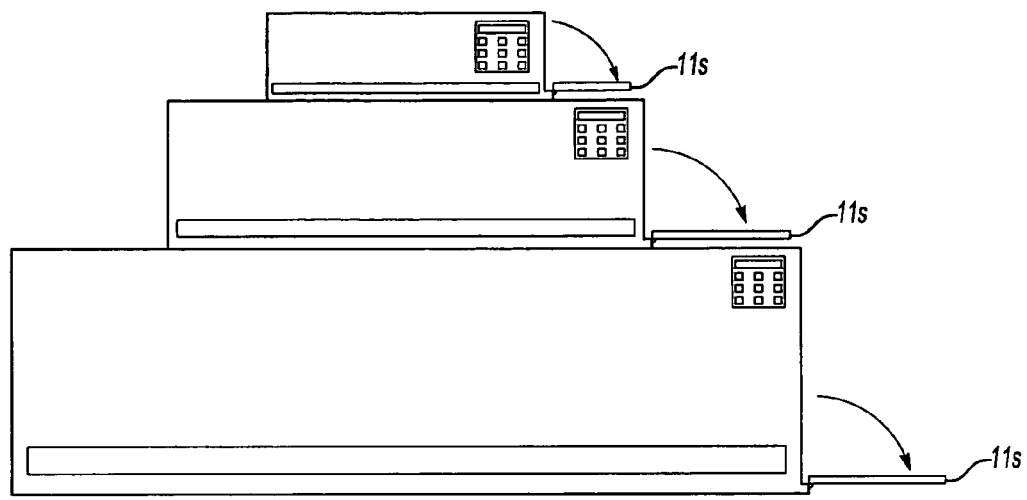
FIG. 3 is a front view of another pipe storage chest according to the present invention.

The chest 12 includes a top loading door 11t for top loading (FIG. 2) and/or a side loading door 11s (FIG. 3). The loading door 11 is a secured door that is lockable to prevent access other than by authorized persons. The loading door 11 provides for loading of large quantities of materials M independent of the dispensing opening 14. A side loading door 11s is particular desirable when a multiple of chests are stacked to provide, for example only, a multiple of pipe lengths in a single location (FIG. 3).

Figure 4:
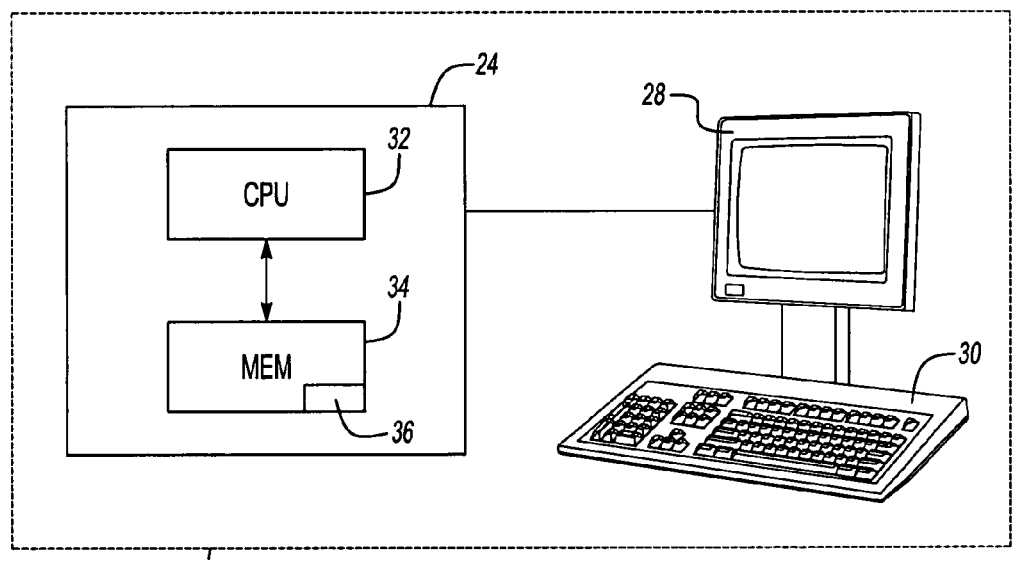
FIG. 4 is a block diagram of one embodiment of a controller.

Referring to FIG. 4, the controller 16 includes a computer module 24 which is connected to an employee interface 26 including input and output devices. Preferably, the controller 16 is weatherproof. The employee interface 26 includes a display 28, such as a high resolution LCD or flat panel display. The interface 26 also includes input devices 30, preferably a plurality of buttons and directional keypad, but alternatively including a mouse, keyboard, keypad, remote device or microphone. Alternatively, the display 28 can be a touch screen display.

The input device receives identification information from an employee such as employee number, job numbers, or the like. The controller 16 also receives requests from the employee for a particular quantity of material. That is, the controller 16 provides the security and authorization to actuate the material dispensing opening 14.

The computer module 24 includes a CPU (illustrated schematically at 32) and storage device 34 connected to the CPU 32. The storage device 34 may include a hard drive, CD ROM, DVD, RAM, ROM or other optically readable storage, magnetic storage or integrated circuit. The storage device 34 contains a database (illustrated schematically at 36) including a detailed sequence of material dispensing information and the related employee identification information.

Figures 5A, 5B, 6:
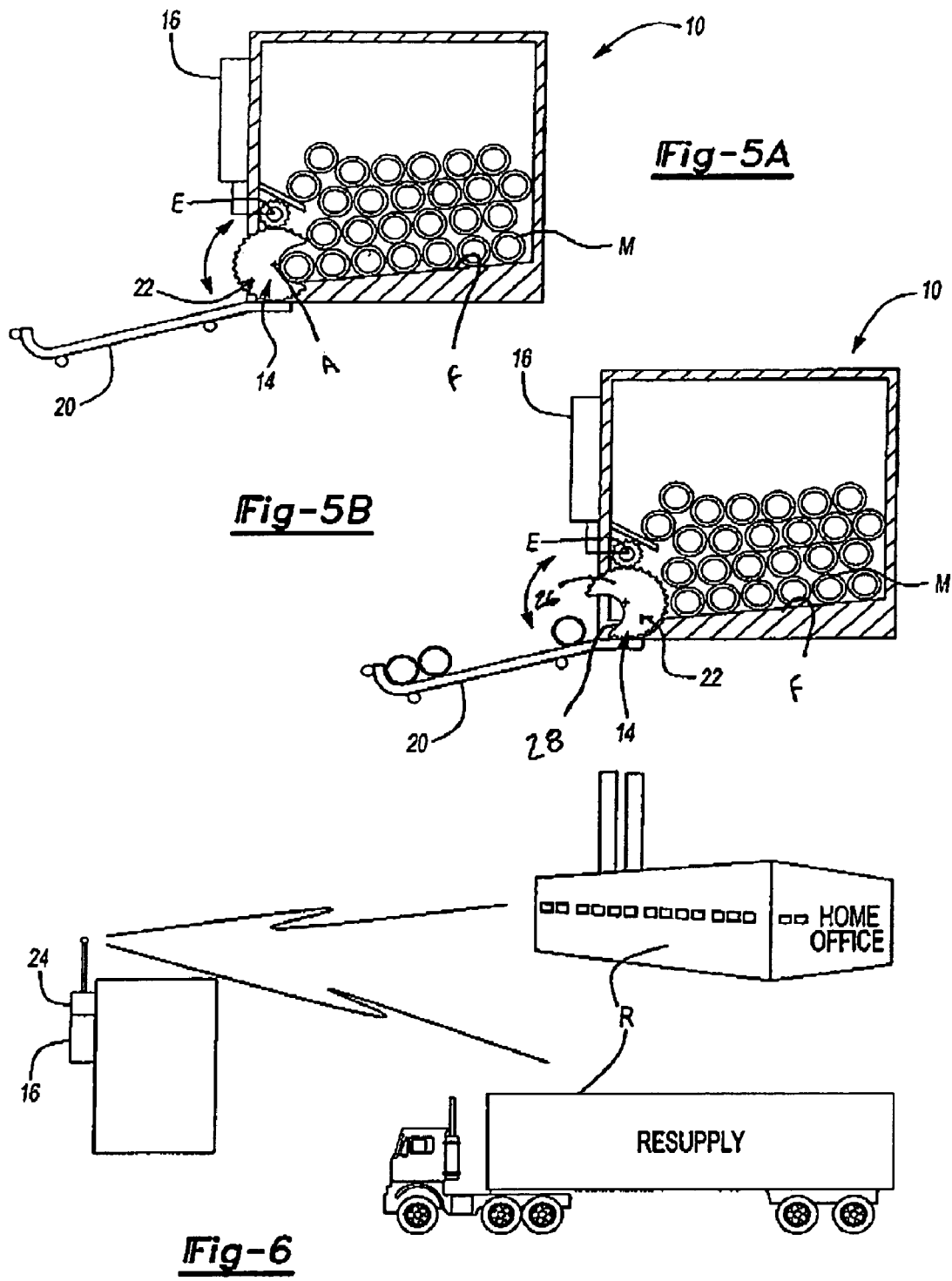
FIG. 5A is side view of the pipe storage chest illustrating a material dispensing opening in a first position.
FIG. 5B is side view of the pipe storage chest illustrating a material dispensing opening in a second position.
FIG. 6 is a schematic representation of a communication system for the storage chest according to the present invention.

Referring to FIG. 5A, the material dispensing opening 14 dispenses the materials M from within the chest to a temporary storage portion 20. The material dispensing opening 14 preferably includes a rotational door 22 which rotates a single piece of material from within the chest 12 into the temporary storage portion 20 in response to the controller 16. That is, each revolution of the rotating door 22 delivers a single piece of material which is fed thereto by a sloped floor F (FIG. 5B). The rotationaJ door 22 is a generally cylindrical member with a U-shaped material receipt groove 28 which receives a single piece of material. The rotational door 22 may be actuated many conventional manner such as by an electric motor E or the like which rotates the rotational door 22 about an axis A. It should be understood that other delivery system will likewise benefit from the present invention such as, for example only, a system which operates in a manner like a can dispensing machine mechanism.

The material dispensing opening 14 prevents access to the chest 12 other than through the controller 16. It should be understood that the term basket is to be construed broadly and includes any device which holds a quantity of material M which has been released from the chest 12. The temporary storage portion 20 provides an accessible temporary storage for the employee which may be particularly useful for a receiving a relatively large quantity of materials at one time.

Referring to FIG. 6, a communication system 24 provides for communication between the controller 16 and a remote location R such as a home office re-supply operator or the like. The communication system 24 is preferably wireless such as through cellular communication systems or the like. The controller 16 preferably stores the employee inputted information and periodically send the stored information to the remote site R so as to simplify inventory management and alert re-supply operators such that the system 10 will provide adequate material supply.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A materials storage chest system comprising:
   a lockable storage chest for storing a plurality of construction articles;
   a door defined at least partially along a longitudinal length of said storage chest that selectively moves a desired quantity of construction articles from said plurality of construction articles;
   a temporary storage portion adjacent to said door that receives said desired quantity of construction articles from said lockable storage chest; and
   a controller that selectively actuates the door in response to an employee identification.

2. The materials storage chest system as recited in claim 1, wherein said controller receives a numerical value to actuate the door to dispense a quantity of material equivalent to said numerical value.

3. The materials storage chest system as recited in claim 2, wherein said numerical value is limited to a predetermined quantity.

4. The materials storage chest system as recited in claim 1, further comprising a communication system which communicates data from said controller to a remote location.

5. The materials storage chest system as recited in claim 1, wherein said lockable storage chest is water resistant.

6. The materials storage chest system as recited in claim 1, wherein said temporary storage portion comprises a materials receiving basket.

7. The materials storage chest system as recited in claim 1, wherein said temporary storage portion is accessible to an operator for retrieving said desired quantity of construction articles.

8. The materials storage chest system as recited in claim 1, wherein said temporary storage portion holds said desired quantity of construction articles before said desired quantity of construction articles are removed from said temporary storage portion.

9. The materials storage chest system as recited in claim 1, wherein said lockable storage chest includes a top-loading door.

10. The materials storage chest system as recited in claim 1, wherein said lockable storage chest includes a side-loading door.

11. The materials storage chest system as recited in claim 1, further comprising a second lockable storage chest for storing a plurality of second construction articles that are different from said plurality of construction articles.

12. The materials storage chest system as recited in claim 11, wherein said second lockable storage chest includes a side-loading door.

13. The materials storage chest system as recited in claim 1, wherein said desired quantity of construction articles includes multiple construction articles.

14. The materials storage chest system as recited in claim 1, further comprising a controller that selectively actuates said door to dispense said desired quantity of construction articles.

15. The materials storage chest system as recited in claim 1, wherein said employee identification comprises an employee number.

16. The materials storage chest system as recited in claim 1, wherein said employee identification comprises a number associated with a task of an employee.

17. The materials storage chest system as recited in claim 11, wherein said plurality of construction articles comprise articles having a first size and said second plurality of construction articles comprise articles having a second size that is different from said first size.

18. The materials storage chest system as recited in claim 1, wherein said lockable storage chest includes a first side and a second side different from said first side, said first side including a lockable loading door and said second side including said door to move said desired quantity of construction articles.

* * * * *

UNITED STATES PATENT AND TRADEMARK OFFICE
CERTIFICATE OF CORRECTION

PATENT NO. : 7,149,600 B2
APPLICATION NO. : 10/681696
DATED : December 12, 2006
INVENTOR(S) : Joseph D. Rippolone Page 1 of 1

It is certified that error appears in the above-identified patent and that said Letters Patent is hereby corrected as shown below:

ON THE TITLE PAGE:

Assignee's name should read as follows:

Item (73) Assignee: Waterfall, Inc., Detroit, MI (US)

Signed and Sealed this

Sixth Day of March, 2007

JON W. DUDAS
*Director of the United States Patent and Trademark Office*